United States Patent
Ziegler

(10) Patent No.: US 6,621,271 B2
(45) Date of Patent: Sep. 16, 2003

(54) DEVICE FOR CONTROLLING OPERATION OF A VEHICLE BATTERY

(76) Inventor: Georg Ziegler, Augsburger Strasse 29 a, Gersthofen (DE), D-86368

(*) Notice: Subject to any disclaimer, the term of this patent is extended or adjusted under 35 U.S.C. 154(b) by 0 days.

(21) Appl. No.: 10/183,030

(22) Filed: Jun. 26, 2002

(65) Prior Publication Data

US 2003/0016022 A1 Jan. 23, 2003

(30) Foreign Application Priority Data

Jun. 29, 2001 (DE) .......................... 101 31 170

(51) Int. Cl.[7] .......................... G01N 27/416
(52) U.S. Cl. ...................... 324/426; 324/425
(58) Field of Search ................ 324/426, 425, 324/433, 427; 320/104, 128, 132, 134, 144, 153

(56) References Cited

U.S. PATENT DOCUMENTS

| | | | |
|---|---|---|---|
| 4,731,601 A | * 3/1988 | Nowakowski et al. | 340/439 |
| 5,838,136 A | * 11/1998 | Waugh | 320/106 |
| 6,321,531 B1 | * 11/2001 | Caren et al. | 60/275 |
| 6,441,506 B2 | * 8/2002 | Nakashima | 290/40 C |

* cited by examiner

*Primary Examiner*—Lawrence Luk
(74) *Attorney, Agent, or Firm*—Martin Fleit; Paul D. Bianco; Fleit Kain Gibbons Gutman & Bongini P.L.

(57) ABSTRACT

A device for controlling the operation of a vehicle battery exhibits two current paths for connecting the battery to the vehicle electrical system. Here, the first current path allows current to flow in both directions and the second current path only allows a charging current to flow from the vehicle electrical system to the battery. In addition, the first current path contains a switch which is only closed when the voltage at the generator connection is less than a predetermined value. Apart from this, a measuring device which measures a change in the state of charge of the battery, a storage device which stores the instantaneous state of charge of the battery, and a checking device which checks a predetermined electrical criterion for the maximum attainable state of charge of the battery, are provided. The instantaneous state of charge and the attainment of the maximum attainable state of charge are indicated to the user of the vehicle by an indicating device which also provides information about the minimum possible starting temperature in the instantaneous state of the battery.

14 Claims, 4 Drawing Sheets

DEVICE FOR CONTROLLING OPERATION OF A VEHICLE BATTERY

FIELD OF THE INVENTION

The invention relates to a device for controlling the operation of a vehicle battery.

BACKGROUND OF THE INVENTION

Although the battery in a motor vehicle represents a known weak point from the viewpoint of reliability, at present there is still no dependable and inexpensive device available for monitoring the state of the battery. This is due above all to the fact that the battery state that governs the starting ability of the vehicle is dependent on a large number of factors such as, for example, temperature, voltage, current load when charging and discharging, and the age of the battery. As a result, efforts were made to take account of these factors in very complex and involved calculations. Therefore, it was proposed among other things that the variation in the voltage during starting be monitored and different empirical data be incorporated in the evaluation.

German Patent No. DE 35 20 985 C2 discloses a device for monitoring the state of charge of the starter battery of a motor vehicle which continuously measures the battery current and the battery voltage and integrates the measured current to determine the lost charge. In the currentless state of the battery, the device detects the settling equilibrium voltage and calculates a hypothetical battery capacity from this equilibrium voltage and the charge previously extracted while in operation. A measurement for the instantaneous state of charge of the battery is calculated from the charge extracted when the battery current is flowing again and the calculated hypothetical battery capacity according to a predetermined formula.

German Patent Application No. DE 43 41 826 A1 teaches a method for determining the state of charge of an electrical energy store from which a starter motor of an internal combustion engine influenced by a control device and/or electrical consumers are supplied with electrical energy. In order to be able to describe the state of charge of the electrical energy store as accurately as possible, it is proposed in a first variant of the method that the voltage present at the energy store and the current flowing be detected during the starting operation. In the process, the current in the control device is differentiated according to the time. When relative maxima occur, the appropriate voltage value is detected and a magnitude characterising the state of charge of the energy store is derived from this. According to a second variant of the method, the variation in time of the internal resistance of the energy store is calculated through a series of successive synchronised current and voltage measurements and this is used to determine the instantaneous state of charge of the energy store on the basis of a reference characteristic stored in the control device.

All the methods of this kind require very accurate detection of the measurement data and complex data processing due to the problem of the accumulation of measuring errors over lengthy periods of time.

SUMMARY OF THE INVENTION

Therefore, an underlying object of the invention is to create a device for controlling the operation of a vehicle battery which, without major intervention in the vehicle electrical system, allows reliable and accurate monitoring of the state of the battery and thus an indication of the starting ability of the battery for the vehicle user.

The present invention relates to a device for controlling the operation of a vehicle battery and includes two current paths for connecting the battery to the vehicle electrical system. The first current path allows current to flow in both directions and the second current path only allows a charging current to flow from the vehicle electrical system to the battery. In addition, the first current path contains a switch which is only closed when the voltage at the generator connection is less than a predetermined value.

In other embodiments, a measuring device which measures a change in the state of charge of the battery, a storage device which stores the instantaneous state of charge of the battery, and a checking device which checks a predetermined electrical criterion for the maximum attainable state of charge of the battery, are provided. The instantaneous state of charge and the attainment of the maximum attainable state of charge are indicated to the user of the vehicle by an indicating device which also provides information about the minimum possible starting temperature in the instantaneous state of the battery.

The invention ensures that the vehicle battery reaches the state of maximum charge, referred to hereinafter as the fully charged state, as rapidly as possible in operation. This greatly simplifies the object of monitoring the state in that in said fully charged state the starting ability is now dependent solely on parameters which are simple to detect such as the ambient temperature and the service age of the battery. As long as the fully charged state does not apply, which is the case in particular shortly after a starting operation or after use of energy-consuming devices while the engine is switched off, the charge balance resulting from consumption and charging is included in the state of the battery and must be taken into account when determining the starting ability.

BRIEF DESCRIPTION OF THE DRAWINGS

An embodiment example of the device according to the invention is described in the following with reference to the drawings in which.

DETAILED DESCRIPTION OF THE INVENTION

To keep the cost as low as possible, the circuits described in the following can be produced, to the extent possible, using analogue techniques and consideration of the complex processes during the operation of the vehicle battery is simplified as far as possible. The objective sought is that the battery reaches the state of maximum possible charge as rapidly as possible in operation. This state, referred to here as the fully charged state, cannot be equated with charging the battery to its rated capacity since the ambient temperature and the service age in particular can reduce the effective capacity. To bring the battery to its fully charged state as rapidly as possible, a battery management system is necessary which has the following objectives: the battery must be charged and steps must be taken to ensure that it is not discharged. To this end, the generator alone supplies the vehicle electrical system as soon as it has reached a certain voltage after the starting of the engine. The battery only supplies the vehicle electrical system when the engine is switched off. In addition, the battery current must be smoothed. This allows over-voltages and losses in the battery to be reduced and its life to be increased due to reduced gasification, which also helps to simplify the calculation for the state of charge.

The circuit illustrated in FIG. 1, whose function is described in the following, achieves these objectives. As soon as the voltage supplied by the generator has reached a certain level, the battery can only be charged further through a diode D1. A combination of an inductance L1 and capacitors C1 and CX smoothes the charging current. When the generator no longer supplies sufficient voltage (due to the engine being switched off or the generator being faulty), the diode D1 is bridged. This is achieved by the relay 1 dropping out, which is controlled by a contact of the charging indicator lamp. The starter motor remains connected directly to the battery as usual.

Figure 1:
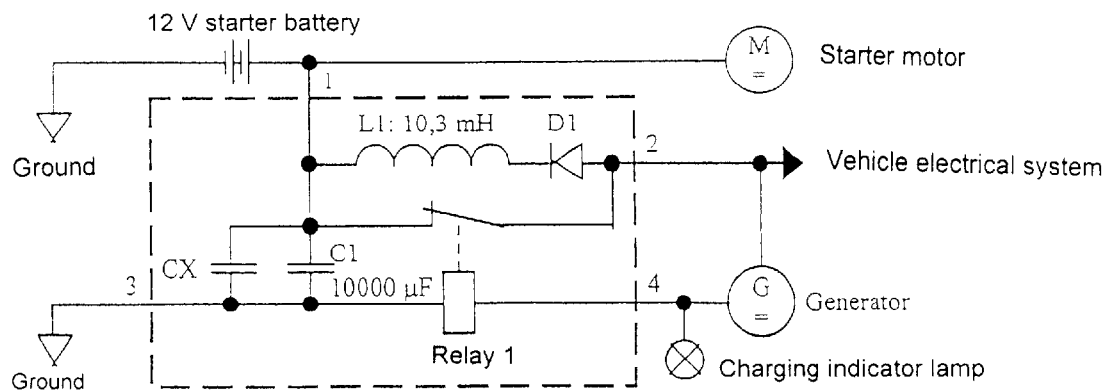
FIG. 1 shows a circuit for connection of the battery to the generator and the vehicle electrical system.
Figure 2:
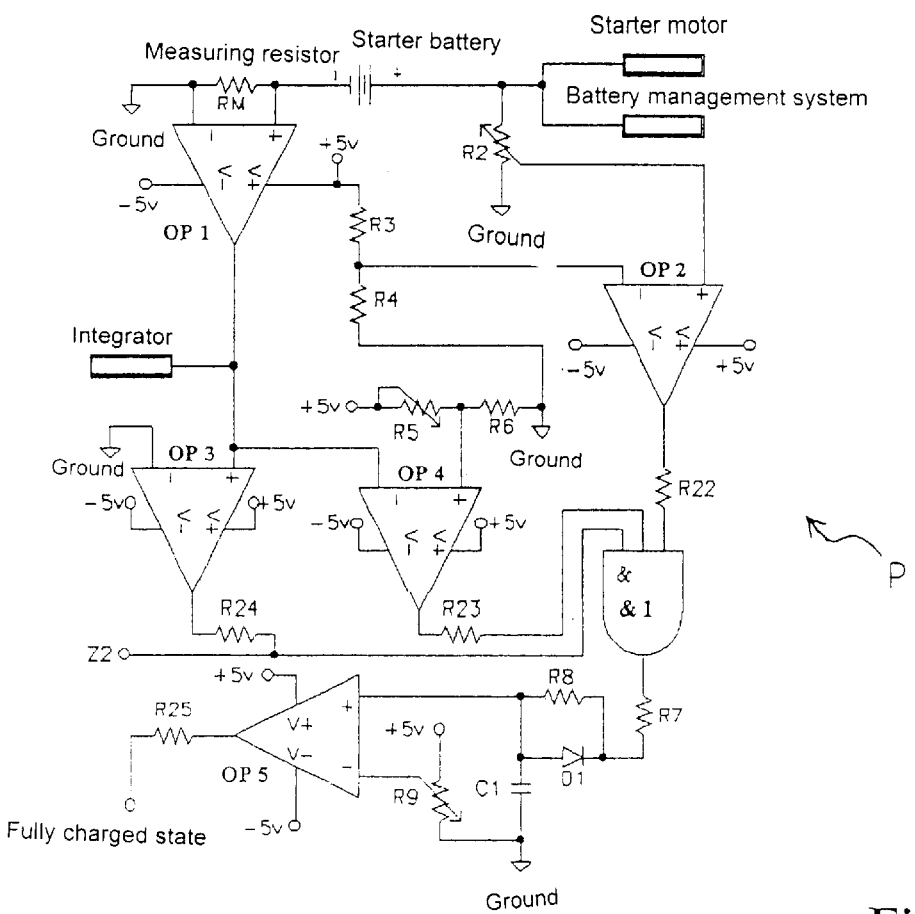
FIG. 2 shows a circuit for establishing the fully charged state of the battery.

The fully charged state of the battery, which it is the main purpose of the circuit according to FIG. 1 to achieve as rapidly as possible, can be established by the circuit illustrated in FIG. 2. As it is not possible to reproduce the conditions of the relevant standard (DIN EN 60095-1) for the fully charged state of a battery while a motor vehicle is in operation, according to the invention the following simplified definition of the fully charged state is used as a basis:

1. The battery voltage lies above a predetermined limit value (e.g. 13V).
2. The battery current flows in the charging direction.
3. The battery current is less than a predetermined limit value (e.g. 0.8 A).
4. Conditions 1 to 3 last for a predetermined interval of time (e.g. 10 s).

The satisfaction of conditions 1 to 4 is checked by the circuit according to FIG. 2 as described below. Firstly, the operation amplifier OP1 amplifies the voltage drop at the measuring resistor due to the battery current by a factor of the order of magnitude of 100. The operation amplifier OP2 checks whether the battery voltage is greater than a predetermined limit value (e.g. 13 V) (condition 1). The operation amplifier OP3 checks whether the battery current is greater than 0, i.e. whether it is flowing in the charging direction (condition 2). The operation amplifier OP4 checks whether the battery current is less than a predetermined limit value (e.g. 0.8 A) (condition 3). The effect of the temperature can be taken into account with a temperature-dependent resistor at R5 and R6. If conditions 1 to 3 are satisfied, the capacitor C1 is charged through the AND-gate &1 via R7 and R8 (FIG. 2). If just one condition is not satisfied, C1 is discharged via D1 and R7 since the output of the gate &1 is then at logic level 0.

The operation amplifier OP5 checks whether the output of the gate &1 is at logic level 1 for at least a predetermined interval of time (e.g. 10 s). If the voltage at C1 reaches the value set at R9, the output of OP5 changes to logic level 1. Thus, the mentioned interval of time is set at R9. The output of OP5 supplies the binary information as to whether the battery is in its fully charged state or not.

The connection point marked "battery management system" in FIG. 2 produces the reference to the circuit in FIG. 1. The provision of the supply voltages for the active components contained in the circuit according to FIG. 2 is not described here, as this is a measure that will be familiar to those of ordinary skill in the art.

If the battery is not in its fully charged state, the instantaneous current charge balance must be monitored. This is the function of the circuit illustrated in FIG. 3 whose operation is explained in the following. The connection point marked "battery management system" in FIG. 3 also produces the reference to the circuit in FIG. 1, as in FIG. 2.

Figure 3:
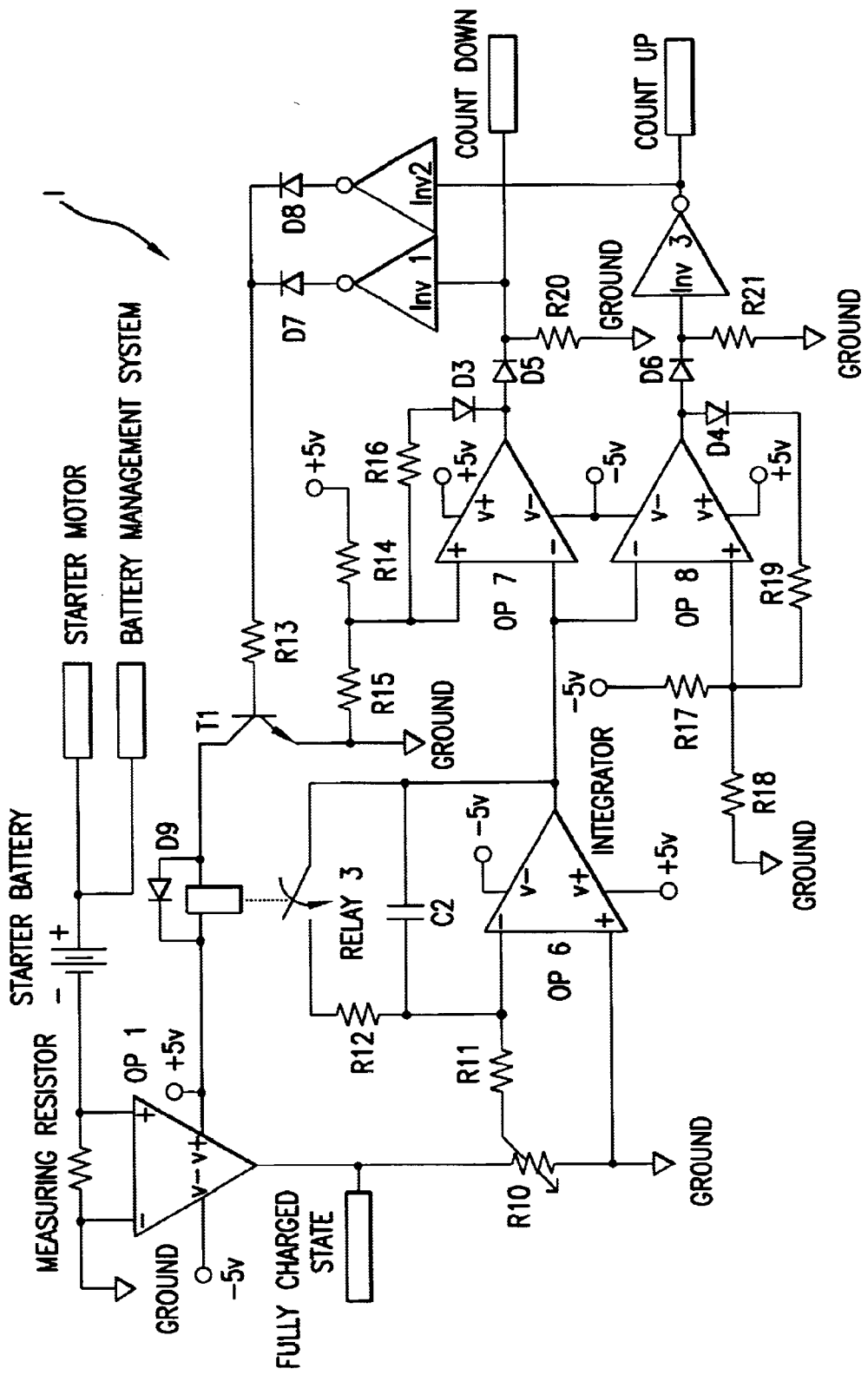
FIG. 3 shows a circuit for determining the instantaneous state of charge of the battery.

The operation amplifier OP1, which is identical to that in the circuit in FIG. 2 and which is also illustrated purely for clarity together with the battery and the measuring resistor in FIG. 3, amplifies the voltage drop at the measuring resistor due to the battery current by a factor of the order of magnitude of 100.

The operation amplifier OP6 integrates the output voltage of OP1, using the product $(R10+R11) \cdot C2$ as the time constant. If the output voltage of OP6 reaches a specific positive threshold value, the output of the operation amplifier OP7 changes from logic level 1 to logic level 0. This causes the relay 3 actuated via the inverter Inv1 and the transistor T1 to discharge the capacitor C2, so that the output voltage of OP7 returns to logic level 1. As a result, a binary counter connected in series with the "count down" connection point is decremented. The counter, with a working width of 4 bits for example, serves primarily to limit the integration time constant $(R10+R11) \cdot C2$ to a value which can be achieved at favourable cost, i.e. in particular to ensure that the required capacitance of the capacitor C2 does not become too high. In addition, it causes the measurement of the quantity of charge to be digitised. R16 and D3 ensure switching with hysteresis at OP7.

The operation amplifier OP8 works in the same way as OP7, but with a negative threshold value, and is connected to the "count up" input of the binary counter. In this way, the counter is incremented or decremented according to the direction of the battery current every time a certain quantity of charge flows into or out of the battery. The quantity of charge corresponding to one counting unit is influenced by the amplification factor of the operation amplifier OP1, the values of the resistors R10 and R11, and the capacitance of the capacitor C2.

Figure 4:
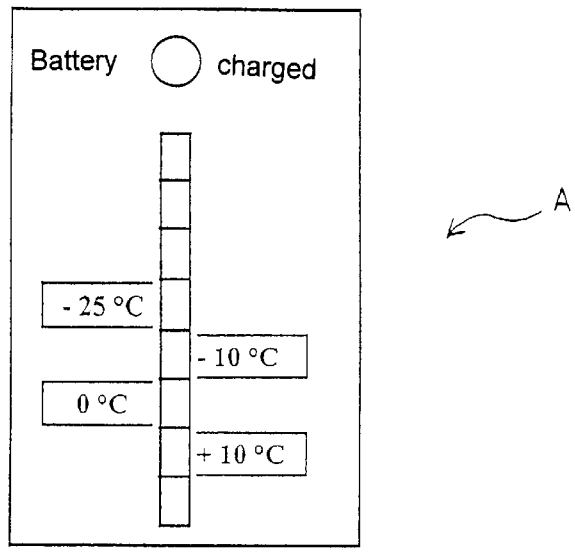
FIG. 4 shows a diagrammatic illustration of a battery state indicator.

To make sense, long before starting a journey, e.g. when parking his vehicle in the evening, the user of a vehicle must be able to ascertain whether he can still start it the next morning. This function can be performed by the indicating device illustrated in FIG. 4 which carries out the following tasks:

informs the driver about the condition of the battery with regard to its age,
informs the driver about the state of charge of the battery,
informs the driver about the starting ability of the battery depending on the temperature.

If the fully charged state is attained, the "battery charged" diode is illuminated. In addition, as many light emitting diodes in the bar display are illuminated as corresponds to the instantaneous attainable state of maximum possible charge, irrespective of how many were illuminated before. Thus, the state indicator is corrected to a defined value independent of the accuracy of previous charge balance calculations. If the charge is subsequently reduced, the bar sections are extinguished starting from the top, and if the charge is subsequently increased, more bar sections are illuminated again, working upwards. Here, each bar section corresponds to a certain quantity of charge.

To take account of the effect of the age on the state of the battery, the age of the battery can be measured by means of a clock which then deactivates a section of the bar indicator at certain empirically established intervals of time, e.g. every 1.5 years, starting from the top, and the sections, once deactivated by the clock, cannot be switched on again. In the named example, after six years in operation the upper four diodes of the bar illustrated in FIG. 4 could no longer be illuminated, even if the "battery charged" indicator is illuminated. This indicates that the battery is at least six years old, that it no longer attains its rated capacity, even when in the fully charged state, and that there is a danger that the vehicle may not start at minus 25° C. An excessive battery age can also be indicated by a warning light.

The number of bar elements illuminated indicates the state of charge of the battery. Depending on the resolution, i.e. the number of sections, direct conversion into ampere hours is possible. In addition, the indicator is also scaled so that it also indicates the effect of temperature on the available charge. If for example only the lowest three sections of the bar are illuminated when parking the vehicle in the evening, this indicates that if the forecast overnight frost occurs, the vehicle possibly may not start in the morning.

The fact that the corrosion of the battery due to age and the effect of the temperature on the available capacity are taken into account through corresponding correction or calibration of the battery indicator means that these factors are eliminated when calculating the state of the battery. This greatly reduces the cost of the circuitry. Obviously, on principle, these factors can also be taken into account in the computing and shown in a different manner, e.g. in the form of an indication of the minimum possible starting temperature on a multi-digit digital display.

Figure 5:
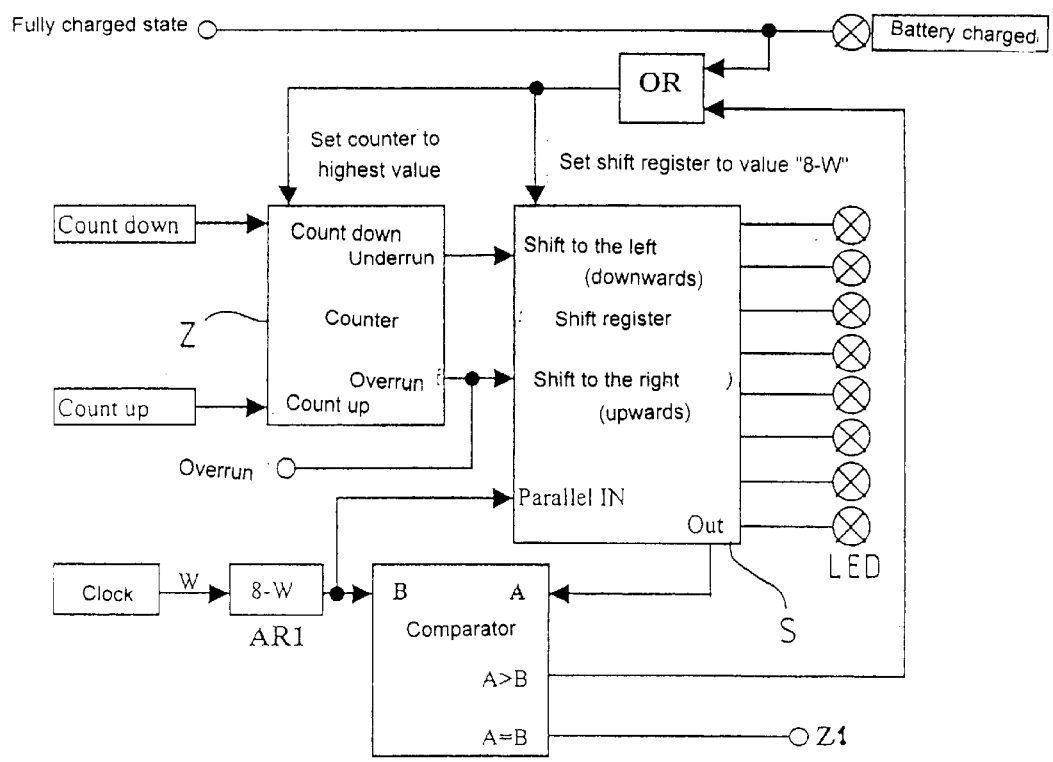
FIG. 5 shows the block circuit diagram of a device for controlling the battery state indicator according to FIG. 4.

The control of the indicator is described in the following with reference to FIG. 5. When the fully charged state is detected, the counter is set to its maximum value by means of the OR-gate OR and the shift register is loaded with the maximum possible number of ones, which results in the illumination of the maximum possible number of LEDs in the bar indicator. The bit combination 8-W with said maximum possible number of ones is determined by the arithmetical unit AR1 from the age W of the battery indicated by the clock. The "battery charged" indicator is also illuminated when the fully charged state is recognised. The "fully charged state" input connection in FIG. 5 is connected to the output marked "fully charged state" of OP5 in the circuit in FIG. 2.

When the state of charge is changed by the battery discharging (due to a starting operation or current consumption when the engine is switched off), the counter is in each case decremented by pulses arriving at the "count down" input. Conversely, the counter is in each case incremented by pulses arriving at the "count up" input while the battery is being charged by the generator. The "count down" and "count up" input connections are connected to the output connections with the same designations of the circuit in FIG. 3. When its maximum value is exceeded, the counter emits the signal "overrun" and the content of the shift register is shifted by one place, illuminating one more LED in the bar indicator unless all the possible LEDs are already illuminated. If the count drops below the zero, it emits the signal "underrun" through which the content of the shift register is shifted by one place in the other direction, which leads to the extinction of the topmost LED which was previously illuminated.

The comparator compares the content of the shift register with the bit combination 8-W and, when the maximum value predetermined by 8-W is exceeded, immediately reloads the shift register with this maximum value through the OR-gate OR, ensuring that the maximum value is not exceeded continuously. When the content of the shift register matches the maximum value 8-W, the comparator emits a signal Z1. This indicates that the charge balance is in equilibrium, i.e. that the maximum possible number of LEDs in the bar indicator is illuminated.

Figure 6:
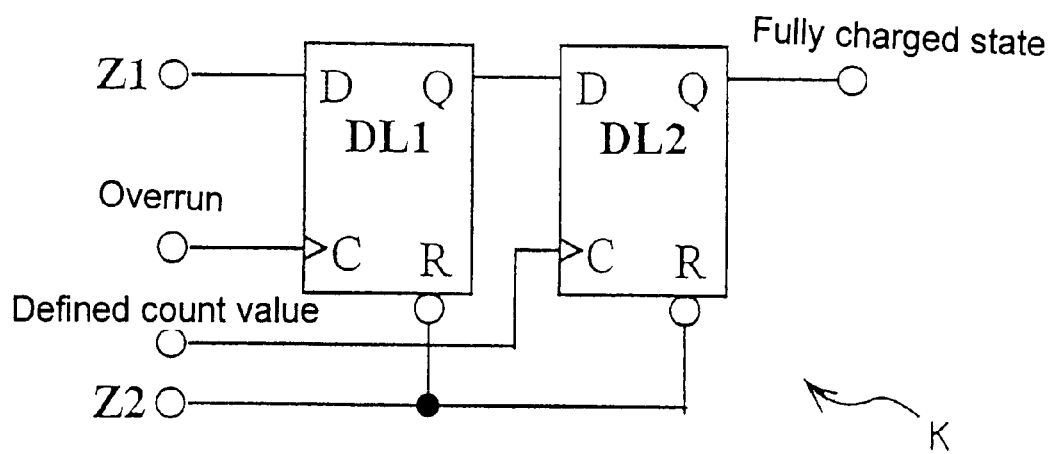
FIG. 6 shows an alternative to a part of the circuit according to FIG. 2.

A part of the circuit according to FIG. 2 can be replaced by the circuit according to FIG. 6 with the aid of the signal Z1 from the comparator and the fully charged state can be determined in a different way, as explained in the following. Since with the pure charge balance calculation (current integration) an error occurs due to losses, in particular when charging, the battery is only considered to be fully charged when a specific quantity of charge has been introduced in excess of that removed from it previously. This correcting quantity of charge can either be estimated according to the currents measured for the charge balance calculation, or a correcting quantity of charge sufficient for normal operation is determined empirically and taken into account.

Each bar section of the LED indicator corresponds to 16 units of charge. Therefore, the output of the D-latch DL1 in FIG. 6 switches to logic level 1 when the counter overrun signal indicates that the last unit of charge of the uppermost possible bar section has been attained. The connections "overrun" and Z1 in FIG. 6 correspond to the identically named connections in FIG. 5. Z1 gives the circuit according to FIG. 6 the binary information as to whether the uppermost possible bar section has been attained or not. The output of the D-latch DL2 emits the binary signal indicating whether the fully charged state has been attained or not. It changes to logic level 1 if the correcting quantity of charge has been introduced in addition to the maximum possible quantity of charge. This is indicated by means of a defined count value of the binary counter. Thus, for example, the binary count value 8 corresponds to a correcting quantity of charge of 6.25% of the maximum possible total quantity of charge (8/(8 bar sections×16 units of charge)×100%=6.25%).

The connection Z2 is identical to that in FIG. 2. This resets DL1 and DL2 when OP3 indicates that charge has been removed from the battery. Thus, with this variant, the circuit according to FIG. 3 is reduced to the measuring resistor, the operation amplifiers OP1 and OP3 and the resistor R24. This variant actually assumes that the battery was fully charged from the start. If this should not be the case, the system is self-correcting since the battery management system (FIG. 1) ensures that the fully charged state is attained after travelling a short distance and that the battery remains charged as long as the engine is running.

In principle, the battery management system (FIG. 1) can also be operated independently of the charge state calculation and the state indicator. If the battery is to be charged with a higher voltage (e.g. 16 V according to DIN EN 60095-1) in order to allow a very short charging time, this can be achieved very easily by modification of the existing connection of the charging indicator lamp. After this, the battery is fed from the normal 14 V electrical system to maintain the charge in order to minimise gasification and corrosion. The required smoothing function is already present in the battery management system.

A major advantage of the battery management system according to the invention lies in the fact that not only is a fully charged battery with increased service life and an easily monitored state of charge available almost continuously, but that this makes it possible to reduce the size of the battery and thus save weight and expense. The fact that the battery no longer feeds any current in to the vehicle electrical system, in particular at low engine speeds, should not be a problem for although the voltage of the generator falls at low engine speed, resulting in a reduction in the brightness of the lighting, this only occurs when stationary (at idle speed) when the brightness of the lighting is not of decisive importance from a safety standpoint. In addition, if necessary, it is possible to supply consumers which are very sensitive to voltage directly from the battery, bypassing the battery management system, or to buffer the vehicle electrical system additionally by a second battery of much lower capacity and/or a capacitor.

While various descriptions of the present invention are described above, it should be understood that the various features could be used singly or in any combination thereof. Therefore, this invention is not to be limited to only the specifically preferred embodiments depicted herein.

Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. Device for controlling the operation of a vehicle battery, comprising:

a first terminal for connecting the device to the battery, a second terminal for connecting the device to the vehicle electrical system, a third terminal for connecting the device to the vehicle ground, and a fourth terminal for connecting the device to the generator of the vehicle;

and first and second current paths for connection of the battery terminal to the vehicle electrical system terminal, wherein the first current path allows current to flow in both directions between the battery terminal and the vehicle electrical system terminal and contains a switch which is closed only when the voltage at the generator terminal is less than a predetermined value; and wherein the second current path allows a charging current to flow only in the direction from the vehicle electrical system terminal to the battery terminal.

2. Device according to claim 1 further comprising a smoothing device which smoothes the current flowing along the second current path from the vehicle electrical system connection to the battery connection.

3. Device according to claim 1 further comprising a measuring device which measures a change in a state of charge of the battery, and a storage device which stores an instantaneous state of charge of the battery.

4. Device according to claim 3 further comprising an indicating device for indicating a starting ability of the battery to a user of the vehicle, in which the instantaneous state of charge is linked to parameters independent of the state of charge.

5. Device according to claim 4 wherein the parameters independent of the state of charge include ambient temperature.

6. Device according to claim 4 wherein the parameters independent of the state of charge include age of the battery, and a time measuring device is provided for measurement of the age of the battery.

7. Device according to claim 6 wherein as the age of the battery increases, the indicating device indicates a state of charge increasingly differing in a downward direction from the state of charge actually measured.

8. Device according to claim 4 wherein the indicating device indicates information as to a minimum temperature at which the battery can still start the engine of the vehicle.

9. Device according to claim 8 wherein the indicating device indicates the instantaneous state of charge of the battery, and information about a minimum possible starting temperature is provided by a scale designed according to a temperature behaviour of the battery.

10. Device according to claim 4 wherein the indicating device indicates information as to whether the battery is in a maximum attainable state of charge.

11. Device according to claim 1 further comprising a checking device which checks a predetermined electrical criterion for a maximum attainable state of charge of the battery, and emits an electrical signal which indicates satisfaction of this criterion.

12. Device according to claim 11 wherein the criterion for the maximum attainable state of charge consists in the battery voltage lying above a predetermined minimum value and the charging current lying below a predetermined maximum value for a predetermined length of time.

13. Device according to claim 1 further comprising a measuring device which measures a change in a state of charge of the battery, a storage device which stores an instantaneous state of charge of the battery, and a checking device which checks a predetermined electrical criterion for the maximum attainable state of charge of the battery and emits an electrical signal which indicates satisfaction of this criterion.

14. Device according to claim 13 wherein the criterion for the maximum attainable state of charge consists in the measuring device measuring charging of the battery by a predetermined quantity of charge after the state of charge stored in the storage device has reached a predetermined maximum value.

* * * * *